UNITED STATES PATENT OFFICE.

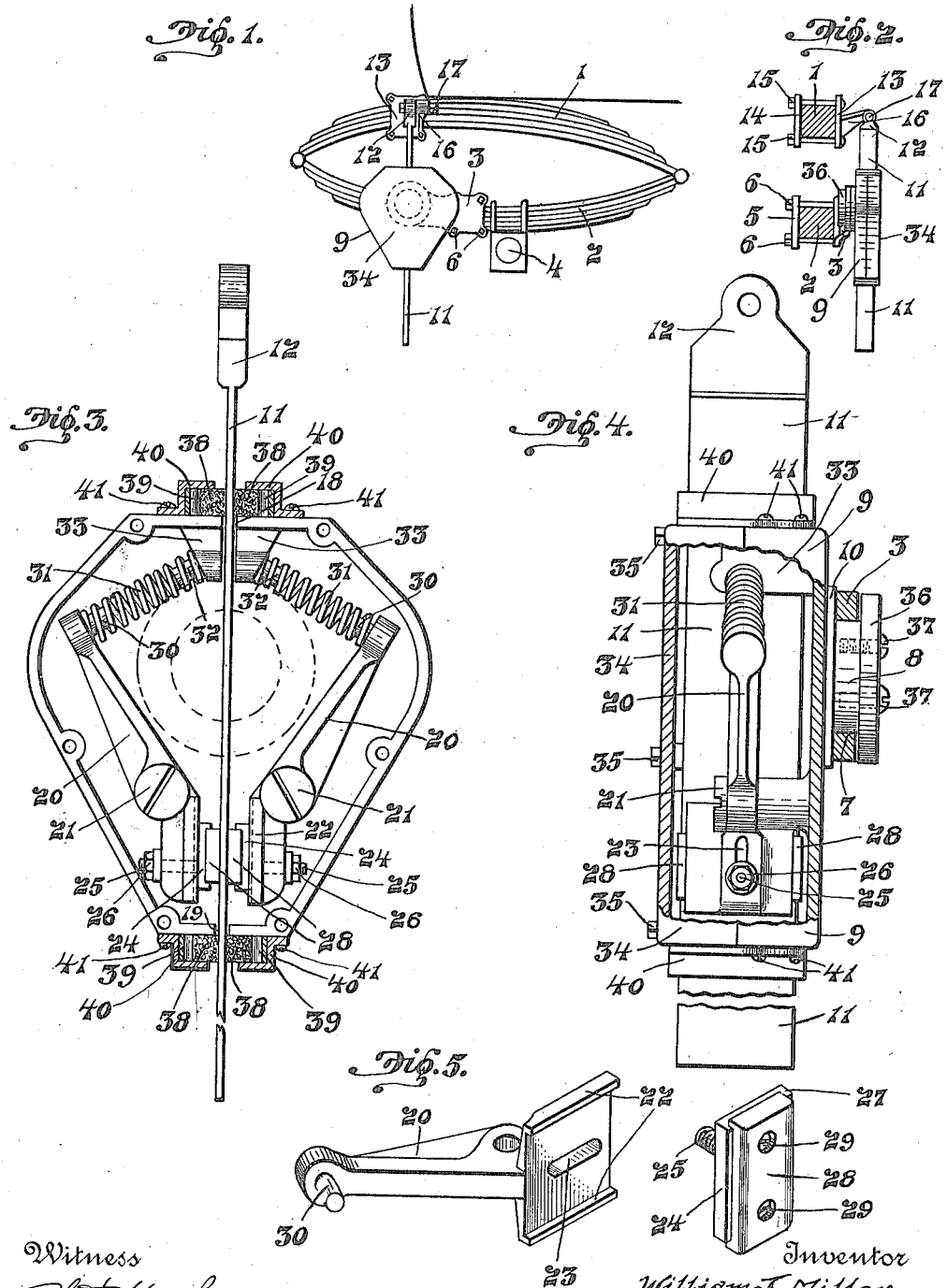

WILLIAM J. MILLER, OF CANTON, OHIO.

SHOCK-ABSORBER.

1,181,787. Specification of Letters Patent. Patented May 2, 1916.

Application filed April 24, 1915. Serial No. 23,579.

*To all whom it may concern:*

Be it known that I, WILLIAM J. MILLER, a citizen of the United States, residing at Canton, in the county of Stark and State of Ohio, have invented a new and useful Shock-Absorber, of which the following is a specification.

This invention relates to new and useful improvements in shock absorbers and has more especial reference to a shock absorber adapted for use upon the springs of automobiles and similar vehicles and designed to absorb the sudden shock and strain coming upon a spring when passing over obstructions or ruts or other unevenness in the road.

It is well understood that vehicle springs are usually broken, not upon the compression of the spring due to the vehicle passing over an obstruction, but rather upon the recoil or rebound of the spring and it is the object of this invention to provide a shock absorber which is adapted to retard the upward movement of the spring, thereby taking up the vibration of the spring and absorbing the shock, thus preventing the spring from breaking.

Another object of this invention is to provide a shock absorber which may be easily and readily applied to vehicle springs of the usual construction and so constructed as to permit of the free unrestricted movement of the spring on the compression of the same, but serving to retard the expansion or upward movement of the spring, thus preventing any abrupt recoil or rebound of the same.

Another object is to provide a shock absorber of the character referred to which may be easily and readily adjusted in order to accommodate springs of various sizes and in which the resiliency of the parts may be increased or diminished as the occasion requires.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the drawing: Figure 1 is a front elevation of my improved shock absorber, showing the same applied to a vehicle spring of the usual construction. Fig. 2 is a side elevation of the same, the spring being shown in section for the purpose of illustration. Fig. 3 is a front elevation of the shock absorber upon an enlarged scale, the cover plate being removed and parts shown in section for the purpose of illustration. Fig. 4 is a side elevation of the same with parts broken away to show the interior construction. Fig. 5 is a detached perspective view of one of the grip levers, the grip plate being shown detached therefrom.

Similar numerals of reference indicate corresponding parts throughout the several figures of the drawings.

Referring more especially to the accompanying drawings, the numerals 1 and 2 represent the upper and lower members respectively, of a pair of elliptical springs of the usual construction used on automobiles and similar vehicles.

The numeral 3 indicates an arm which is attached to the lower spring 2, adjacent the axle 4, by any suitable and well known means such as the clamp plates 5 and bolts 6. The arm 3 is provided, near its outer extremity, with an aperture 7 which receives the boss 8 provided upon the casing 9 within which the several parts of the device are contained. An annular shoulder 10 is formed around the base of the boss 8 for the purpose of spacing the arm 3 away from the casing 9.

A slide 11, preferably in the form of a steel plate as shown, is slidably mounted through the vertical center of the casing and provided at its upper extremity with a head 12. A bracket 13 is connected to the upper spring 1 by any suitable means such as the clamp plates 14 and bolts 15, said bracket being provided with the arm 16 to which is connected the head of the slide 11, by means of a bolt 17 or its equivalent. The slide 11, is located through suitable slots 18 and 19 in the upper and lower walls respectively of the casing 9.

Pivoted within the casing and upon each side of the slide 11 is a grip lever 20. These grip levers are pivoted by means of screws 21 or their equivalents and are provided with grip plates arranged to contact with the slide 11 at all times. The lower or shorter arm of each lever is provided along each vertical edge of its inner face with a flange 22 and an elongated slot 23 is located through the vertical center of each of said arms. A grip plate 24 is slidably mounted between the flanges 22 upon each of the grip levers, said grip plate being provided with a screw threaded stem 25, which extends through the slot 23, a nut 26 being provided upon the extremity of said stem for securing the grip plate in any desired position upon the grip lever. Each of the grip plates is preferably formed with an inwardly disposed flange 27 along its upper and lower edges, a friction block 28 composed of fiber or equivalent material being firmly attached to said grip plate by means of screws 29 or their equivalents. The upper or longer arms of the grip levers are each provided near their upper extremity with an inwardly disposed stud 30 and a spiral compression spring 31 is located around a stud 32, said last named studs being carried upon the lugs 33, which are preferably formed integral with the casing adjacent to the top wall thereof, and spaced from each side of the slide 11.

A cover plate 34 is attached to the casing by means of screws 35. For the purpose of preventing the boss 8 from becoming disengaged from the arm 3, a plate 36 is connected to the face of said boss by means of screws 37, said plate being preferably of disk form and of greater diameter than the boss 8, thus retaining the casing in engagement with the arm 3.

In order to prevent dust or similar objectionable foreign matter from entering the casing through the slots 18 and 19 a felt pad 38 is held in contact with the grip 11 upon either side thereof by means of leaf springs 39 which are interposed between said felt strips and the housings 40, said housings being connected to the upper and lower walls of the casing by means of screws 41.

As the vehicle upon which the springs are mounted passes over an obstruction, the springs will be compressed, the slide 11 being moved downwardly through the casing and between the grip plates. Immediately after this compression takes place the spring will be caused to recoil or rebound, moving the slide upwardly through the casing and between the grip plates. The downward movement of the slide through the grip plates will not be restricted, but upon the upward movement of the same the friction blocks carried by the grip plates will engage the slide 11, permitting the slide to move very slowly between said friction blocks, thus preventing an abrupt rebound of the spring. When it is desired to adjust the tension upon the grip levers in order to accommodate springs of various sizes, the nuts 26 are loosened and the grip plates 24 are moved up or down as desired upon the lower arms of the grip levers and the nuts 26 are again tightened, thus holding the grip plates in the desired position.

Although the drawings and above specifications disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A shock absorber, comprising a casing, a slide mounted through said casing, a grip lever pivoted within said casing upon each side of said slide, a grip plate adjustably mounted upon one extremity of each grip lever, a friction block carried by each grip plate and arranged to contact with said slide and a spring bearing against the opposite end of each grip lever arranged to hold said friction blocks in frictional contact with said slide, resilient pads slidably mounted upon the top and bottom walls of the casing and bearing against each side of the slide and means for holding said pads in contact with said slide.

2. The combination with a casing, of a slide longitudinally movable through said casing, an angular grip lever pivoted intermediate its extremities in the casing upon each side of the slide, one arm of each grip lever being located substantially parallel to said slide, grip plates adjustably mounted upon said parallel arms for adjustment toward or away from the pivotal points of said levers and springs attached to the opposite extremities of said grip levers for holding said grip plates in frictional contact with said slide.

3. A shock absorber, comprising a casing, a slide mounted through said casing, a grip lever pivoted within said casing upon each side of said slide, the lower arm of each grip lever being provided with a vertically disposed elongated slot, flanges provided upon the vertical edges of said arms, a grip plate mounted upon each of said arms between said flanges, a screw threaded stem provided upon each grip plate and extending through said elongated slot, a nut provided upon the extremity of said screw threaded stem, a friction block carried by each of said grip plates and arranged to contact with said slide and springs connected to said grip levers for holding said friction blocks in frictional contact with said slide.

In testimony that I claim the above, I have hereunto subscribed my name in the presence of two witnesses.

WILLIAM J. MILLER.

Witnesses:
J. H. BISHOP,
SYLVIA BORON.

Copies of this patent may be obtained for five cents each, by addressing the "Commissioner of Patents, Washington, D. C."